United States Patent
Kline

(10) Patent No.: US 12,514,258 B2
(45) Date of Patent: Jan. 6, 2026

(54) SYSTEM AND METHOD OF PREPARING FROZEN COCONUTS

(71) Applicant: Bio-Diversified Ventures Inc., Lafayette, CO (US)

(72) Inventor: Torin L.T. Kline, Lafayette, CO (US)

(73) Assignee: Bio-Diversified Ventures Inc., Lafayette, CO (US)

( * ) Notice: Subject to any disclaimer, the term of this patent is extended or adjusted under 35 U.S.C. 154(b) by 0 days.

(21) Appl. No.: 16/604,563

(22) PCT Filed: Mar. 9, 2017

(86) PCT No.: PCT/US2017/021649
§ 371 (c)(1),
(2) Date: Oct. 10, 2019

(87) PCT Pub. No.: WO2018/164689
PCT Pub. Date: Sep. 13, 2018

(65) Prior Publication Data
US 2021/0084919 A1 Mar. 25, 2021

(51) Int. Cl.
*A23B 7/04* (2006.01)
*A23B 7/148* (2006.01)
(Continued)

(52) U.S. Cl.
CPC .......... *A23B 7/0425* (2013.01); *A23B 7/0441* (2013.01); *A23B 7/148* (2013.01);
(Continued)

(58) Field of Classification Search
None
See application file for complete search history.

(56) References Cited

U.S. PATENT DOCUMENTS 2,385,140 A * 9/1945 Knowles .............. A23B 7/0408
426/305
2,973,271 A 2/1961 Baldwin et al.
(Continued)

FOREIGN PATENT DOCUMENTS

CA      763671 A  *  7/1967
EP      1360907       11/2003
(Continued)

OTHER PUBLICATIONS

Disaso—Deluxe Young Coconut. Mar. 12, 2015 <web.archive.org/web/20150312014747/http://www.disaso.com/ing/deluxe.html> (Year: 2015).*

(Continued)

*Primary Examiner* — Viren A Thakur
(74) *Attorney, Agent, or Firm* — Knobbe Martens Olson & Bear, LLP

(57) ABSTRACT

The present invention relates to a system and method for preparing frozen coconuts for reliably preserving coconut meat and coconut water inside its own coconut shells. The method comprises drying dehusked coconut, partially freezing the dried dehusked coconut in a chilling unit and freezing the partially frozen dried dehusked coconut in a freezing unit. In one embodiment of the invention, dried dehusked coconut are vacuum sealed and flash frozen to preserve nutrients in a flash freezing unit. The frozen coconuts are stored in frozen storage and have shelf life of over a year. The frozen coconuts, upon thawing, have fresh taste with coconut meat and intact coconut water inside a coconut shell.

18 Claims, 10 Drawing Sheets

(51) Int. Cl.
    *A23B 7/153*    (2006.01)
    *A23N 5/03*    (2006.01)
    *A23N 12/08*    (2006.01)

(52) U.S. Cl.
    CPC ............... *A23B 7/153* (2013.01); *A23N 5/03* (2013.01); *A23N 12/08* (2013.01); *A23V 2002/00* (2013.01)

(56) References Cited

U.S. PATENT DOCUMENTS

| | | | | |
|---|---|---|---|---|
| 3,297,454 | A | * | 1/1967 | Webster ............ F25D 3/11 62/63 |
| 4,307,120 | A | | 12/1981 | Escudero et al. |
| 7,897,189 | B2 | * | 3/2011 | Goldman ............ A23B 7/0408 426/327 |
| 2004/0071846 | A1 | * | 4/2004 | de la Mora y de la Mora ............ A23B 7/015 426/327 |
| 2007/0026120 | A1 | * | 2/2007 | Wight ............ A23B 7/154 426/535 |
| 2008/0241285 | A1 | | 10/2008 | Majeed |
| 2010/0152895 | A1 | | 6/2010 | Dai |
| 2011/0027439 | A1 | * | 2/2011 | Rosich Ferrer ...... A23B 7/0215 426/444 |
| 2014/0272089 | A1 | | 9/2014 | Velasco |
| 2015/0118371 | A1 | * | 4/2015 | Velasco ............ A23L 19/00 426/248 |
| 2015/0359237 | A1 | * | 12/2015 | Brown ............ A23B 7/153 426/324 |

FOREIGN PATENT DOCUMENTS

| | | | |
|---|---|---|---|
| EP | 1360907 | A1 | 11/2003 |
| EP | 1341547 | | 10/2006 |
| EP | 1341547 | B1 | 10/2006 |
| GB | 664320 | A | 1/1952 |
| IN | 200602239 | * | 2/2007 |
| MX | 186456 | B * | 10/1997 |
| PH | 2201500266 | U1 * | 11/2015 |
| WO | WO 2013/010229 | A1 | 1/2013 |
| WO | 2015002553 | | 1/2015 |
| WO | WO 2015/002553 | A2 | 1/2015 |
| WO | 2018164689 | A1 | 9/2018 |

OTHER PUBLICATIONS

Safron, Jeremy—Young Coconuts Oct. 14, 2002 <http://web.archive.org/web/20021014125415/http://www.youngcoconuts.com/benefits.html (Year: 2002).*

"Vietnam Fresh Coconut" Jun. 8, 2015 <http://vietnamfreshcoconut.weebly.com/updating-products> (Year: 2015).*

Facebook.com—Hong Huat Coconut. Mar. 12, 2016 <https://www.facebook.com/honghuatcoconut/photos/a.1135993239758583/1144153762275864/?type=3> (Year: 2016).*

Alibaba—Factory customized young coconut shell polishing machine. 2021 <https://www.alibaba.com/product-detail/Factory-customized-young-coconut-shell-polishing_60619144404.html> (Year: 2021).*

"flickr.com: cherriesfresh." Feb. 24, 2012. <https://www.flickr.com/photos/77242987@N05/6779143236> (Year: 2012).*

Pixnet: The flight of the dandelions. Jul. 25, 2010 <https://tanpopokayu.pixnet.net/blog/post/266884824> (Year: 2010).*

Jangchud, Kamolwan., et al. "Quality changes of burnt aromatic coconut during 28-day storage in different packages." LWT—Food Science and Technology, vol. 40, Issue 7, Sep. 2007, p. 1232-1239 (Year: 2007).*

Appaiah, Prakruthi., et al. "Physico-chemical characteristics and stability aspects of coconut water and kernel at different stages fo maturity." J. Food Sci. Technol. Aug. 2015, 52(8): 5196-5203. (Year: 2015).*

PCT Application No. PCT/US17/21649, International Search Report dated Jun. 15, 2017, 4 pages.

European Patent Application No. 17899628.6, Extended European Search Report dated Nov. 2, 2020. 7 pages.

International Search Report issued in application No. PCT/US2017/021649 on Jun. 15, 2017.

Supplementary European Search Report issued in application No. 1789962.6 on Oct. 15, 2020.

* cited by examiner

SYSTEM AND METHOD OF PREPARING FROZEN COCONUTS

FIELD

Embodiments of the present invention generally relate to a system and method for preparing frozen coconuts and in particularly relates to a system and method for preparing frozen coconuts containing entire coconut meat intact with coconut water preserved within the coconut shell.

BACKGROUND

Coconuts are popularly known for their great numbers of usages, ranging from traditional usages for food and cosmetics. Coconuts are part of regular dishes in many cultures around the world living in tropics and sub-tropics. The primary distinctiveness of coconuts from other fruits is they contain large quantity of drinkable "water", and when immature, are known as tender-nuts or jelly-nuts and may be harvested for potable coconut water. When coconuts mature, they still contain some water and can be used as seed nuts. They can also be processed to give oil from the kernel, charcoal from the hard shell, along with coir from their fibrous husk. Dried coconut flash is called copra. The oil and milk derived from coconuts are commonly used in cooking and frying, as well as in soaps and cosmetics. The husks and leaves can be used to make a variety of products for furnishing and decorating.

Naturally refreshing, coconut water has a sweet and nutty taste. It contains easily digestable carbohydrate in the form of sugar and electrolytes. Not to be confused with high-fat coconut milk or oil, coconut water is a clear liquid in fruit's center which is tapped from young and green coconuts. Coconut water has fewer calories, less sodium, and more potassium than any other sports drink. Ounce per ounce, most unflavoured coconut water contains 5.45 calories, 1.3 grams sugar, 61 milligrams (mg) of potassium, and 5.45 mg of sodium compared to Gatorade, which has 6.25 calories, 1.75 grams of sugar, 3.75 mg of potassium, and 13.75 mg of sodium. As coconut water has less sugar than many sports drinks, sodas and some fruit juices, drinking coconut waters is always a better choice for adults and kids looking for a beverage that is less sweet.

Coconut water has always been a very popular drink in the tropical countries and getting popular beyond the tropics because of their healthy and thirst quenching water, which has increased consumer demand and triggered on increasing sales of the processed coconut water. Once the coconut water exposed to environment it becomes highly perishable for contamination and will lose all its nutrients. Shipping raw coconuts in its natural state is highly uneconomical because of its weight, size, and limited shelf life. Currently, standard process is followed for extending the shelf-life of young fresh coconut water is through high heat pasteurization. Coconut water is pasteurized, processed and stored in cans, bottles, canisters or boxes which kill all its nutrient, electrolytes and flavor, which in turn reduces consumer satisfaction and trust. One more method generally used for preserving coconut water is adding artificial flavors, stabilizers, and sweeteners for increasing the shelf life of coconut water, which reduce the natural flavor of the coconut water. After adding, artificial preservatives in to coconut water all its nutrients are destroyed. In some cases, coconuts are also preserved to increase the shelf-life by dipping in chemicals, but there is a high possibility of which can seep into and poison the coconut meat and water.

Growing health consciousness and consumer demand for coconut water that contains natural flavor and nutrients has stimulated interest in finding alternative technology for preservation of coconut shell with coconut water and coconut meat. Different processes for production of frozen food products are currently known. Either the coconut water is canned or frozen in containers with artificial preservatives or coconut meat is grated and stored in an airtight bag in the fridge. Most of the known processes do not assure preservation of fresh coconuts along with natural flavor, when they are thawed, mainly due to the large amount of water contained inside the coconut. Also, there is no method reported yet which preserve young coconut water inside its own natural environment and no known method to consistently and safely freeze fresh coconut inside its own natural environment without frequently breaking the coconut shell during the freezing process.

For these reasons, in view of above prior art, it is desired to have an improved system and a method for preparation of frozen coconuts, which preserve entire coconut shell intact with coconut meat and coconut water inside the coconut shell.

The primary objective of the present invention is to provide a system and a method for preparation of frozen coconuts, which has coconut meat and coconut water enclosed and intact inside its own hardened coconut shells.

In one another objective of the present invention is to provide a system and a method for preparing frozen coconuts assuring there is no or virtually no damage to the coconut shell having coconut meat and coconut water, even after when they are thawed after freezing.

In another objective of the present invention is to provide a system and a method for preparing frozen coconuts, which do not lose its taste characteristics and which is similar to a fresh coconut.

In one another objective of the present invention is to provide a system and a method for preparing frozen coconuts in which untapped young coconut water is preserved inside its coconut shell for extended period of time without adding any preservatives in its natural environment.

In one another objective of the present invention is to provide a system and a method for preparing frozen coconuts comprising frozen young coconut water, untapped, untouched and preserved intact with coconut meat in its own confined coconut shell.

SUMMARY

Embodiments in accordance with the present innovation disclose a system for preparing frozen coconuts is provided herein. The system comprises a coconut dehusking unit; a drying unit for dehusked coconuts; an optional chilling room for cooling-down the dried dehusked coconuts and producing partially frozen coconuts; a freezing unit for slowly completely freezing the partially frozen coconuts or alternatively a flash freezing unit for quick completely freezing the partially frozen coconuts; and a frozen storage for storing the frozen coconuts containing entire preserved coconut meat and coconut water intact within the coconut shells.

In one embodiment in accordance with the present invention, the system comprises a vacuum-sealing machine which is used to individually seal before chilling or freezing each dried dehusked coconut shell in bags. The vacuum sealed bags apply uniform pressure around each dried dehusked coconut shell to prevent it from further rupturing during freezing. In such embodiment, the completely dried dehusked coconut shell is sealed in K-nylon having 100 micron thickness vacuum bags. The vacuum bags makes contact and applies 360 degrees even pressure or uniform pressure around the dried dehusked coconut shell and helps protecting the coconut shell from contamination and permeably seals the dried dehusked coconut in case a coconut would crack during chilling and/or freezing process.

In one another embodiment in accordance with the present invention, the temperature of chilling room is −5 degree Celsius which further reduces the inside pressure of the dried dehusked coconuts to the levels at which they can then be frozen using flash freezing or slow freezing processes.

In one embodiment in accordance with the present invention, the partially frozen coconut is either contained in a vacuum sealed coconut shell bag which is prepared by sealing dried and dehusked coconut in vacuum bag and then moving vacuum sealed coconut shell bag in the chilling room to produce partially frozen vacuum sealed coconut or the partially frozen coconut is without any packaging and is prepared by directly moving dried and dehusked coconut in the chilling room for preparing partially frozen coconut shell.

In one another embodiment in accordance with the present invention, a coconut holding tray is used. Such container may be either a porous plastic tray or coconut holding tray in the form of a partitioned compartment comprising individual container basket for holding multiple single vacuum sealed coconut shell bags.

In one embodiment in accordance with the present invention, the method used for completely freezing the partially frozen coconuts is either a shock freezing method or a slow freezing method.

In one another embodiment in accordance with the present invention, the temperature of the frozen storage unit is −18 degree Celsius, in another it is −25 degree Celsius, in another it is −6 degree Celsius, and in another it is any temperature at or below 0 degree Celsius.

In one embodiment in accordance with the present invention, the shelf life of frozen coconut is more than one year.

Embodiments in accordance with the present innovation disclose a method for preparing frozen coconuts using shock freezing unit is provided herein. The method includes harvesting 25 days old young coconuts having two layers of coconut meat and sorting of coconuts according to their sizes and quality. Further the method includes storing and resting of raw coconuts in ambient conditions for at least 2 days to reduce the inner pressure of coconuts. The method further includes dehusking of outer green layer and fibrous husk of a raw coconut using a sharp edged weapon leaving the coconut shell without any or minimal amount of fibrous material on the outer surface of the dehusked coconut shell. The method further includes sorting of the coconut shell according to its size, thickness and weight. The method further includes optionally polishing the outer hairs of the dehusked coconut using a polishing machine such as but not limited to a copper bristle polishing machine. The method further includes optionally preventing of oxidation and contamination of the dehusked coconut shell surface and top husk cone by first immersing the dehusked coconut shell into one or several solutions, having anti-oxidant, anti-bug, anti-fungal and anti-mold properties, for preventing oxidation and contamination of the dehusked coconut shell surface and top husk cone. Said solutions can be organic or non-organic solutions such as but not limited to ascorbic acid solution or similar anti-browning solutions, the dehusked coconut shells are then taken out of one or several solutions and let get dry. The method further includes weighing of the dehusked coconuts and moving the dehusked coconuts in a dry room until they lose more than 5% of their initial weight. The method further includes optionally sealing of dried dehusked coconut shell in vacuum bag using a vacuum sealing machine which make contact with the coconut shell and prevent any liquid leakage inside the bag by applying 360 even pressure around the dried dehusked coconut shell, which further prevents cracking of the dried dehusked coconut shell during further freezing process. The method further includes placing the dried dehusked coconuts in a chilling room until the coconut water becomes partially slushy and inner pressure of the vacuum sealed coconut shell bag is further reduced to the levels at which the partially frozen vacuum sealed coconuts can then be completely frozen. The method further includes placing the vacuum-sealed coconut shell bags containing the partially frozen coconuts in an individual container basket or coconut holding tray. The method further includes flash freezing the partially frozen coconut so as to preserve its nutrients by either completely immersing the coconut holding tray in an insulated tub comprising cooling bath mixture for at least 40-50 minutes in between −72 degree Celsius to −65 degree Celsius depending on the batch size of partially frozen vacuum sealed coconut shell bags or by flash freezing the partially frozen coconut inside an air blast tunnel. The method further includes storing the frozen coconut in a frozen storage unit having −18 degree Celsius temperature, or −25 degree Celsius, or −6 degree Celsius, or any temperature at or below 0 degree Celsius.

In one embodiment in accordance with the present invention, the dehusked coconuts are rested for about three days in a dry room having less than 40% humidity and over 25 degree Celsius temperature until they lost more than 5% of their weight.

In one another embodiment in accordance with the present invention, the either vacuum sealed coconut shell bags or simply unpackaged dried dehusked coconuts are moved to a chilling room until the core temperature of the coconut reaches in between −0.1 degree Celsius to −3 degree Celsius for at least 2 days.

In one embodiment in accordance with the present invention, the coconut holding tray is immersed in an insulated tub containing cooling bath mixture for 40-50 minutes. The temperature range of cooling bath mixture is in between −72 degree Celsius to −65 degree Celsius. The cooling bath mixture is alcohol-based, and contains at least one of dry ice and liquid nitrogen, such as, but not limited to, mixtures of 99.9% ethanol and dry ice, or mixtures of methanol and liquid nitrogen.

In one another embodiment in accordance with the present invention, the frozen coconuts are stored in a frozen storage having −18 degree Celsius temperature, in another it is −25 degree Celsius, in another it is −6 degree Celsius, and in another it is any temperature at or below 0 degree Celsius. In one embodiment in accordance with the present invention, the shelf life of frozen coconut is more than one year.

Embodiments in accordance with the present innovation disclose a method for preparing frozen coconuts using slow freezing unit is provided herein. The method includes harvesting 25 days old young coconuts having two layers of coconut meat and sorting of coconuts according to their sizes and quality. Further the method includes storing and resting of coconuts in ambient conditions for at least 2 days to reduce the inner pressure of coconuts. The method further includes dehusking of the outer green layer and the fibrous husk of a raw coconut using a sharp edged weapon leaving the coconut shell without any or minimal amount of fibrous material on the outer surface of dehusked coconut shell. The method further includes optionally polishing the outer hairs of the dehusked coconut using a polishing machine such as but not limited to a copper bristle polishing machine. The method further includes sorting of the coconut shell according to its size, weight and thickness. The method further includes optionally preventing of oxidation and contamination of the dehusked coconut shell surface and top husk cone by first immersing the dehusked coconut shell into one or several solutions, having anti-oxidant, anti-bug, anti-fungal and anti-mold properties, for preventing oxidation and contamination of the dehusked and polished coconut shell surface and top husk cone. Said solutions can be organic or non-organic solutions such as but not limited to ascorbic acid solution or similar anti-browning solutions, the dehusked coconut shells are then taken out of one or several solutions and let get dry. The method further includes weighing of the dehusked coconuts and moving the dehusked coconuts in a dry room for about three days until they lose more than 5% of their weight and the dehusked coconut shell becomes dry. The method further includes optionally sealing of dried dehusked coconut shell in vacuum bag using a vacuum sealing machine which make contact with the coconut shell and prevent any liquid leakage inside the bag by applying 360 even pressure around the dried dehusked coconut shell, which further prevents cracking of the dried dehusked coconut shell during further freezing process. The method further includes placing the dried dehusked coconuts in a chilling room until the coconut water becomes partially slushy and inner pressure of the vacuum sealed coconut shell bag is further reduced to the levels at which the partially frozen vacuum sealed coconuts can then be completely frozen in a freezing unit. The method further includes placing the vacuum sealed coconut shell bags containing the partially frozen coconuts in an individual container basket or coconut holding tray. The method further includes placing the partially frozen coconuts in plastic trays having air-holes allowing airflow within the freezer unit. The method further includes placing the trays containing partially frozen coconuts in a standard freezer for at least 24 hours at −25 degree Celsius temperature depending on the batch size of coconuts. The method further includes storing the frozen coconut shell in a freezer or frozen storage unit having −18 degree Celsius temperature.

In one embodiment in accordance with the present invention, the dehusked coconuts are rested for about three days in a dry room having less than 40% humidity and over 25 degree Celsius temperature until they lost more than 5% of their weight.

In one another embodiment in accordance with the present invention, the either vacuum sealed coconut shell bags or simply unpackaged dried dehusked coconuts are moved to a chilling room until the core temperature of the coconut reaches in between −0.1 degree Celsius to −3 degree Celsius for at least 2 days.

In one embodiment in accordance with the present invention, the partially frozen coconut is either contained in a vacuum sealed coconut shell bag or is a partially frozen coconut without any packaging.

In one another embodiment of the present invention, the frozen coconuts are stored in frozen storage having −18 degree Celsius temperature. In one yet another embodiment in accordance with the present invention, the shelf life of frozen coconut is more than year.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figure 1A:
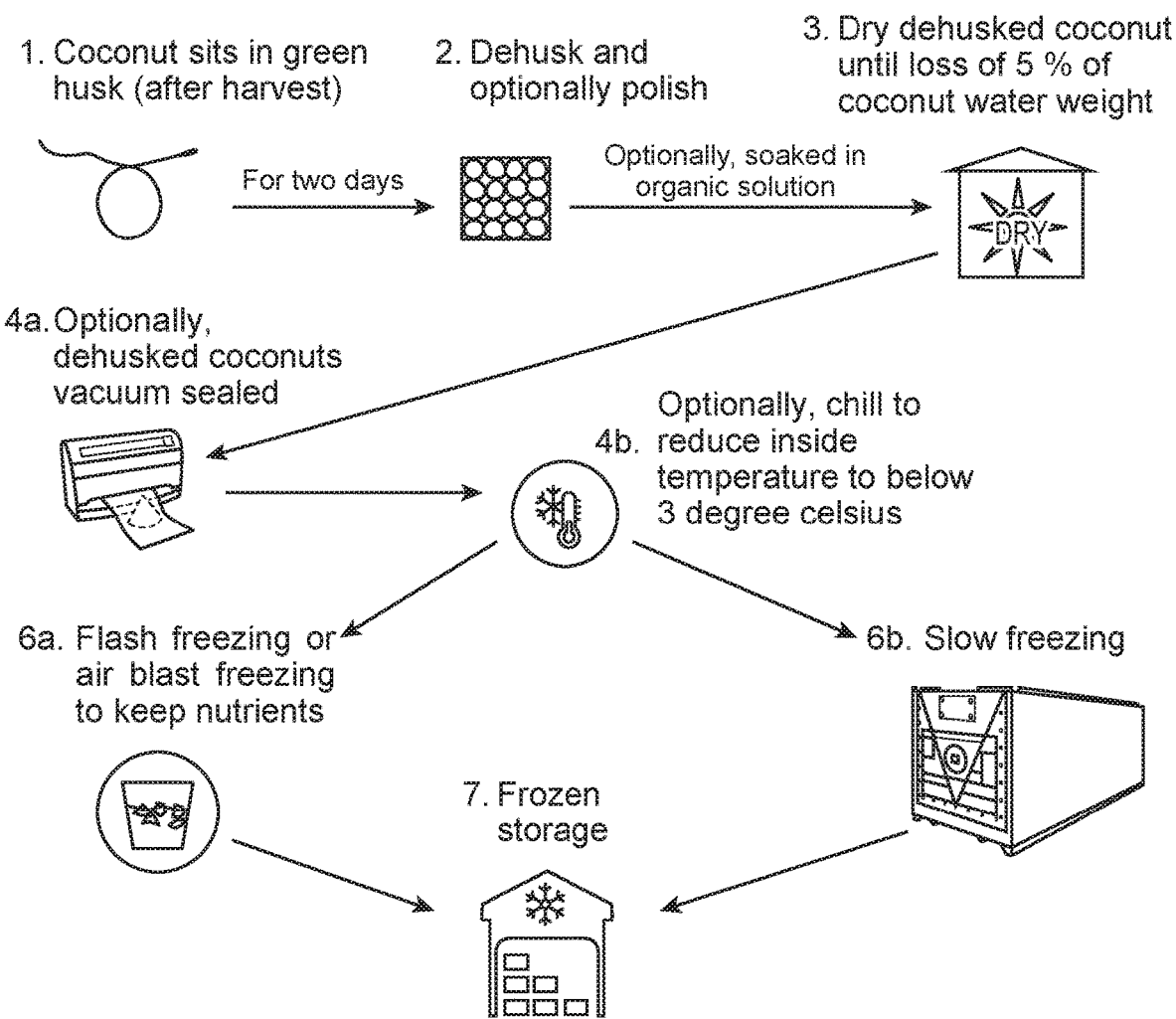
FIG. 1A illustrates a schematic representation of system for preparing frozen coconuts from raw coconuts, according to an embodiment of the present invention.

FIG. 1A illustrates a schematic representation of system for preparing frozen coconuts from raw coconuts up to getting frozen coconuts The system comprises a sorting and dehusking unit whereby the harvested coconuts are being dehusked. The dehusked coconuts are formed by firstly sorting and resting the raw coconuts in green husk for two days so to allow a first reduction of pressure inside the coconut before dehusking the coconut. The dehusked coconut can optionally be polished using polishing machines. The dehusked and optionally polished coconuts are stored in a drying unit until the dehusked coconuts loose at least 5% of their weight. The dried coconuts are then optionally sealed in vacuum bags using a vacuum-sealing machine. Vacuum bags apply uniform pressure around the dried dehusked coconut. Alternatively the dried dehusked coconuts may be left unpackaged. The system further comprises a chilling room having −5 degree Celsius temperature for partially freezing the content of dried dehusked (and optionally vacuum sealed) coconuts and a freezing unit for completely freezing the partially frozen coconuts and forming frozen coconuts enclosing entire coconut water and coconut meat within itself. The system further comprises a freezing unit where the partially frozen (optionally vacuum sealed) coconuts are moved for completely freezing the partially frozen coconuts. The freezing unit either freezes the partially frozen coconut shell by a shock freezing method or by a slow freezing method, forming a frozen coconut enclosing entire coconut water and coconut meat within its own hard shell.

Figure 1B:
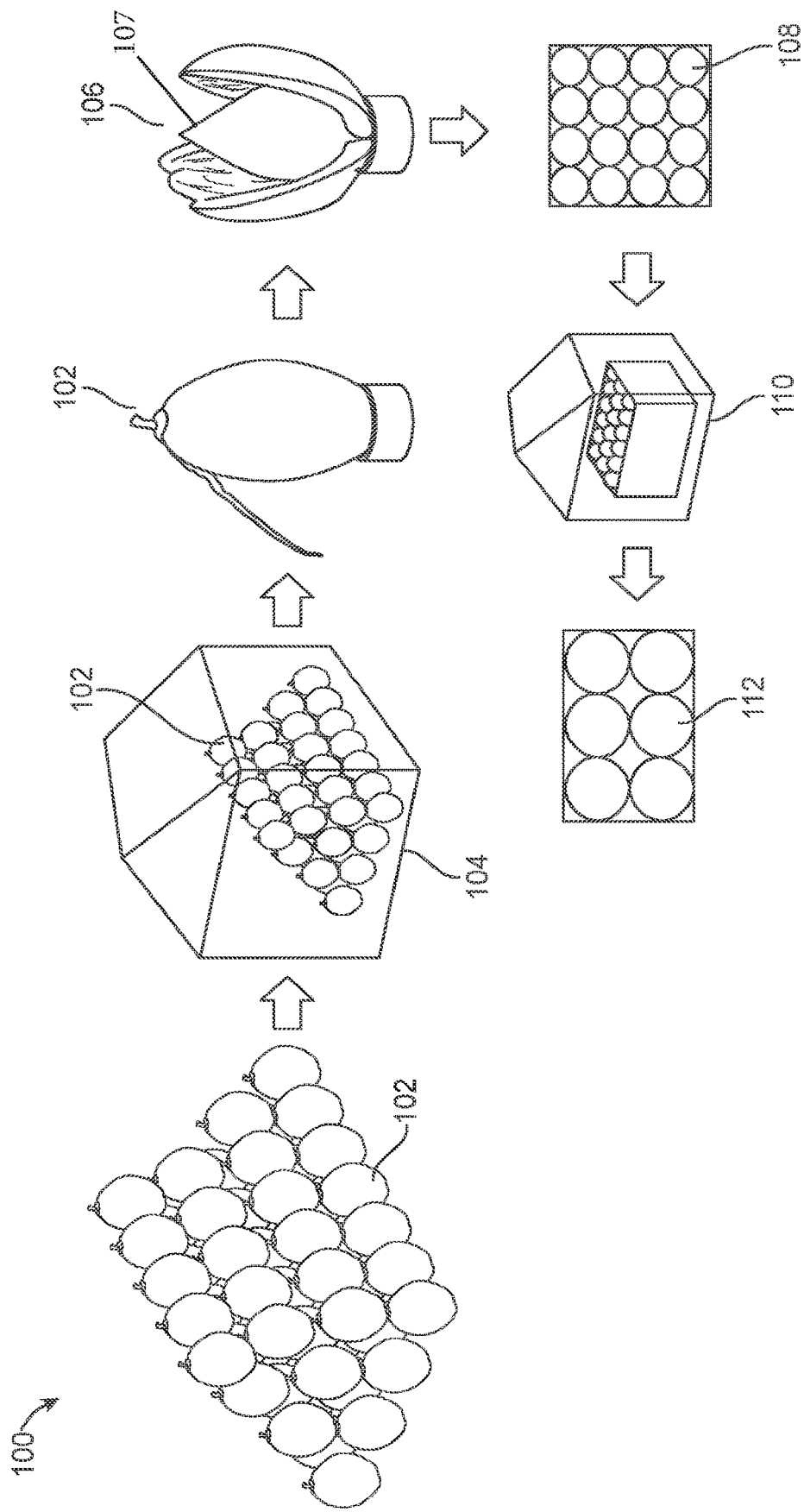
FIG. 1B illustrates a schematic representation of a raw coconut from getting harvested, stored and dehusked up to getting further dried into a drying unit, according to an embodiment of the present invention.

FIG. 1B illustrates a schematic representation of a raw coconut from getting harvested, stored and dehusked up to getting further dried into a drying unit, according to an embodiment of the present invention In the system 100, the raw coconuts 102 after they are collected and picked up by farmers are taken to an inspection facility for different kinds of inspections. The raw coconut 102 is being inspected for any visible outside damage, weighed via scale to ensure it meets minimum weight requirement for purchase and so on. An applied water bucket test (to determine the maturity of the coconut) is also performed to guarantee that the raw coconut 102 contains exactly two layers of coconut meat inside its inner shell. The raw coconut 102 after passing all the quality inspections are stored in a room 104 having ambient temperature and away from direct sunlight for at least 2 days for reducing the inside pressure of the coconut before being dehusked.

The raw coconut 102 after getting dehusked completely by skilled hands wielding machetes turn in to a dehusked coconut 106. The outer green layer (exocarp) and the fibrous husk (mesocarp) of the raw coconut 102 are removed, leaving the shell of the dehusked coconut 106 without or minimal amount of the fibrous material that surrounds it. All the husk is removed optionally excluding a piece of protective cone shaped husk 107 atop the coconut. The remaining husk 107 covers two closed holes and the spore of the shell of the dehusked coconut 106, shielding the delicate opening on top.

The dehusked coconut 106 is then weighed and measured for height and circumference. The dehusked coconut 106 is then separated according to its size which can be small, medium or large. All this information gets updated in the inventory system and tagged accordingly on their mesh bag. The dehusked coconut 106 then waits for optional polishing.

The hair around the shell of the dehusked coconut 106 is optionally removed with a polishing machine such as but not limited to copper bristle polishing machine, similar to that of a shoe shiner. Holding the shell tightly, a worker slowly turns the shell underneath rotating bristles that gently remove the coir without bothering the cone, leaving a smooth shell surface. The shell of the dehusked coconut 106 after getting polished turns into a dehusked and polished coconut 108.

The dehusked and polished coconut 108 after being polished is then placed in a bucket or successive buckets containing one or several organic or non-organic solutions with anti-oxidation, anti-bug, anti-mold or anti-fungal properties including for example but not limited an ascorbic acid solution that prevents oxidation of the surface and top husk 107 cone of the dehusked and polished coconut 108 shell. After a brief period of time, the dehusked coconut 106 is taken out of the one or several solutions and placed in their respected numbered mesh bags and left to dry for further processing.

The dehusked and polished coconut 108 (or simply the dehusked coconut 106) is moved into a drying unit such as a dry room 110 having humidity less than 40% and temperature above 25 degree Celsius until the dehusked and polished coconut 108 has lost more than 5% of its initial inside coconut water weight. A dried dehusked coconut shell 112 is obtained.

Figure 2A:
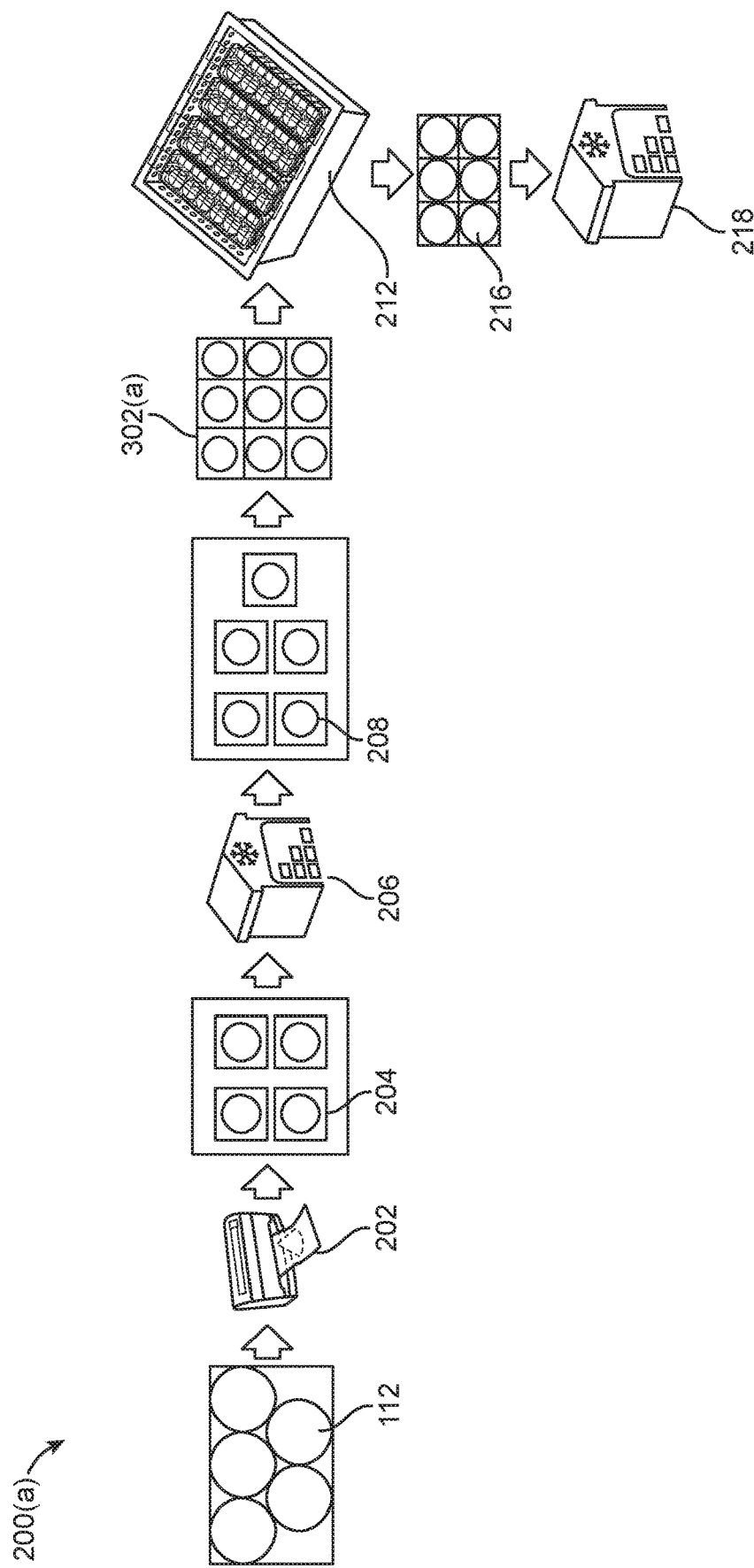
FIG. 2A illustrates a schematic representation of system for preparing frozen coconuts from dried dehusked coconuts sealed in vacuum seal bags before being frozen in shock freezing unit, according to an embodiment of the present invention.

FIG. 2A illustrates a schematic representation of system for preparing frozen coconuts from dried dehusked coconuts sealed in vacuum seal bags before being frozen in shock freezing unit, according to an embodiment of the present invention;

The system 200 (a) comprises a vacuum sealing machine 202 for sealing the dried dehusked coconut 112 in vacuum bag 204 which applies uniform pressure around the dried dehusked coconut shell 112 preventing it from breaking during freezing; a chilling unit such as a chilling room 206 for partially freezing the content of the coconuts and getting partially frozen coconuts 208; and a freezing unit 212 for completely freezing the partially frozen coconuts and forming a completely frozen coconut 216 enclosing entire coconut water and coconut meat within itself.

A dried dehusked coconut 112 is sealed in vacuum bag using vacuum sealing machine 202. Any locally available vacuum sealing machine can be used for sealing coconut shells. The vacuum bags used for sealing dried dehusked coconut 112 are K-nylon bags having 100 micron thickness which make contact with the coconut shell and prevent any liquid leakage inside the bag by applying 360 degree even pressure around the coconut shell and prevent it from rupturing during freezing process. The vacuum bags also protect the coconut shell from rupturing upon thawing.

The vacuum sealed coconut shell bag 204 is moved to a chilling room 206 having −5 degree Celsius temperature to partially froze the content of coconut shell until core temperature of coconut shell reaches anywhere in between −0.1 degree Celsius to −3 degree Celsius. The chilling room helps reducing the inner pressure of the dried dehusked coconut 112 to the levels at which to the coconut may be further freezed without risk of coconut shell cracking during the freezing process.

Figure 3A:
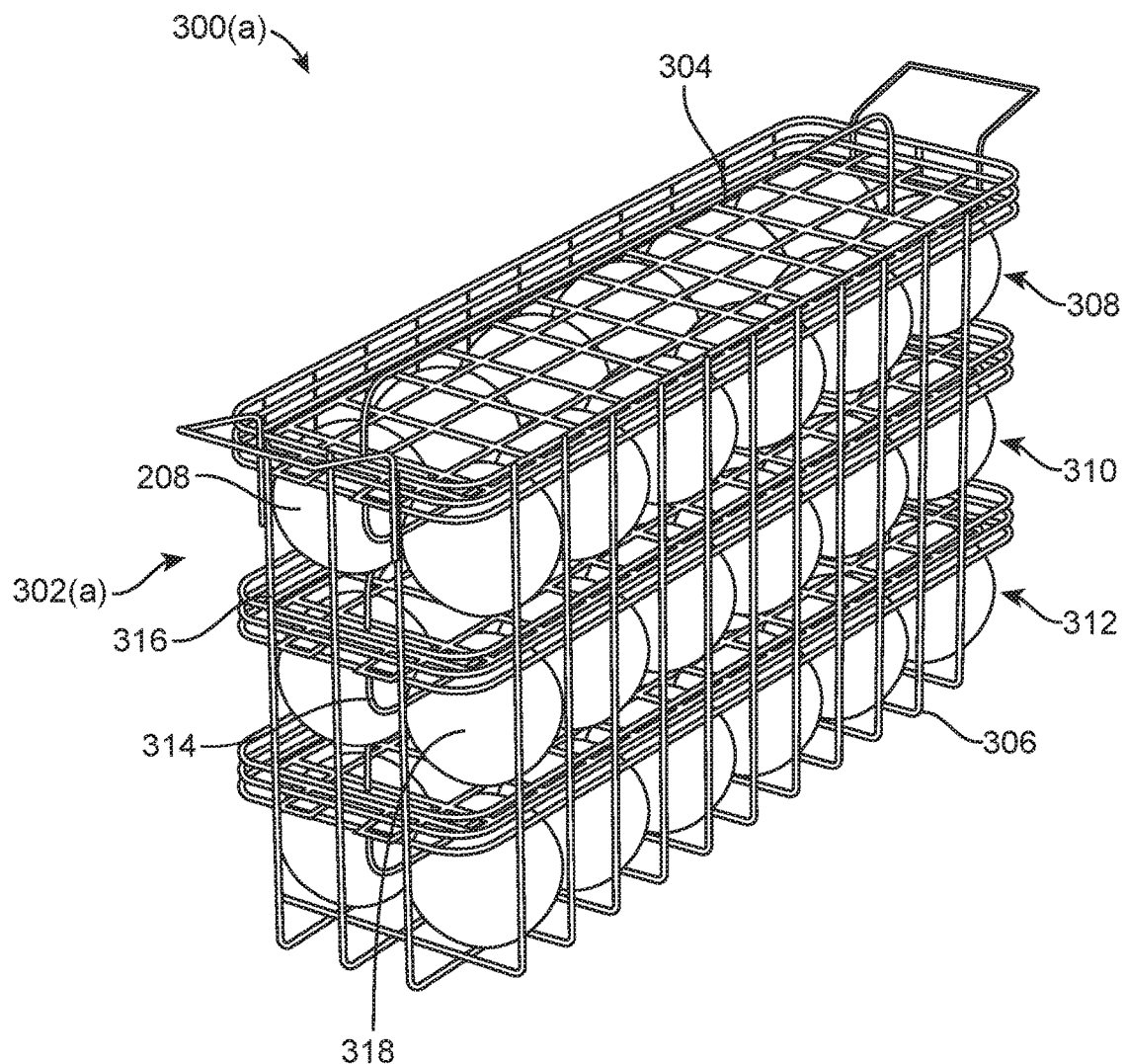
FIG. 3A illustrates a schematic representation of a coconut holding tray capable to hold partially frozen vacuum sealed or unpackaged coconuts to be completely frozen; according to an embodiment of the present invention.
Figures 3B, 3C:
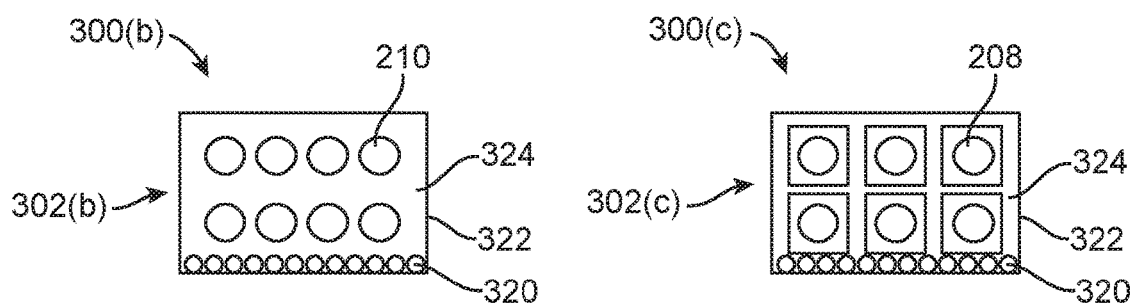
FIG. 3B illustrates a schematic representation of a coconut holding tray capable to hold partially frozen coconuts without any packaging to be completely frozen; according to an embodiment of the present invention.
FIG. 3C illustrates a schematic representation of a coconut holding tray capable to hold partially frozen vacuum sealed coconuts in vacuum sealed bags to be completely frozen; according to an embodiment of the present invention.

The partially frozen vacuum sealed coconuts 208 are arranged on a coconut holding tray 302 (a) and moved to shock freezing unit 212. Referring to FIGS. 3A-3C, each individual container basket holding only one partially frozen vacuum sealed coconut 208. The coconut holding tray 302 (a) is immersed in shock freezing unit 212.

Figure 4:
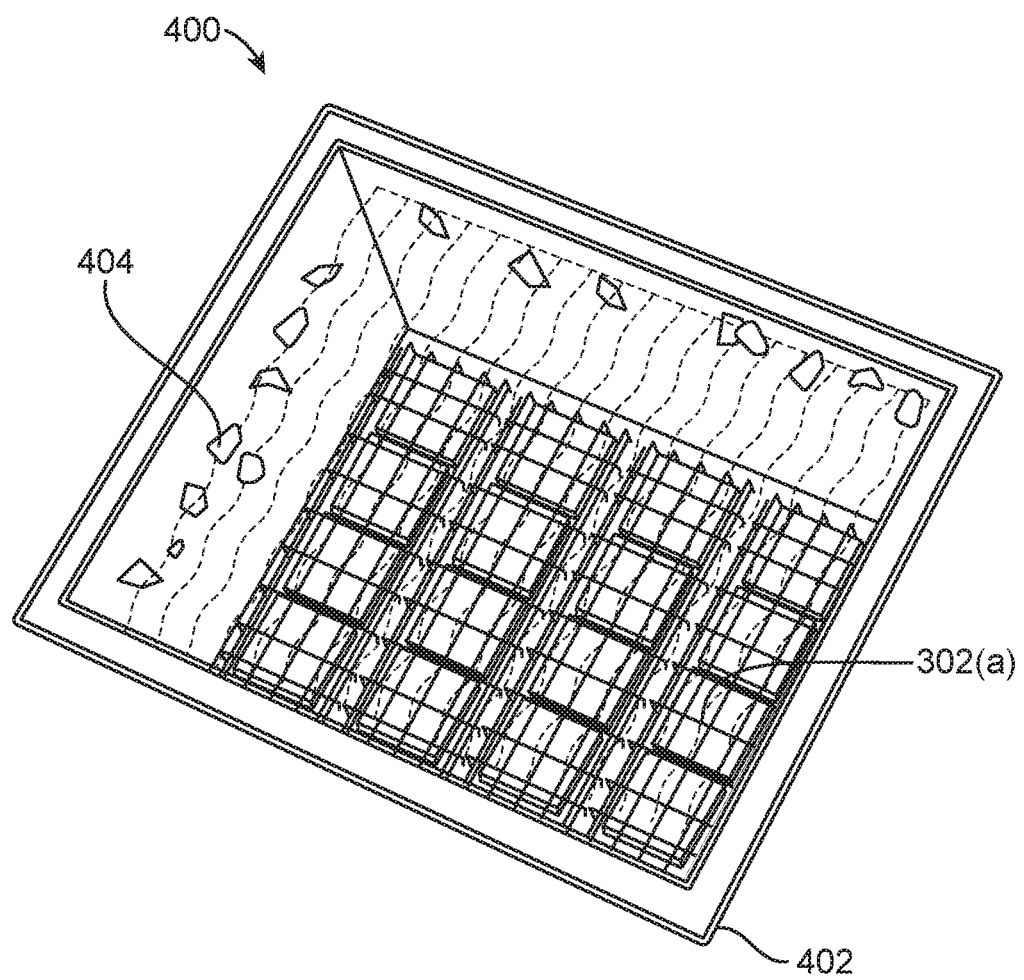
FIG. 4 illustrates a schematic representation of the top view of a shock freezing unit comprising insulated tub, cooling bath mixture and coconut holding tray capable of containing partially frozen vacuum sealed coconuts and freezing the partially frozen vacuum sealed coconuts, according to an embodiment of the present invention.
Figure 5:
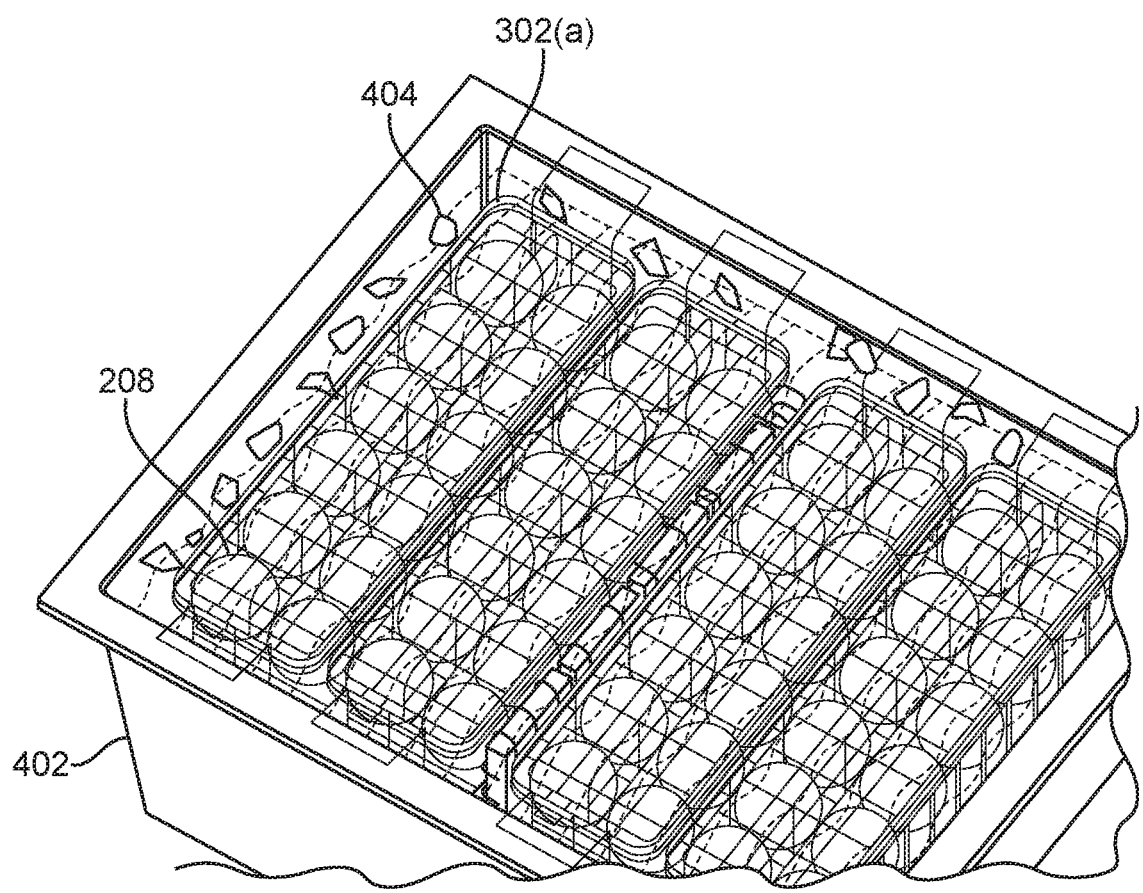
FIG. 5 illustrates a schematic representation of side view of a shock freezing unit comprising insulated tub, cooling bath mixture and coconut holding tray containing partially frozen vacuum sealed coconuts for completely freezing the partially frozen vacuum sealed coconuts, according to an embodiment of the present invention.

The shock freezing unit 212 as shown in FIGS. 4 and 5 comprises an insulated tub 402 for holding coconut holding tray 302 and cooling bath mixture 404 for completely freezing the coconut shell. The coconut holding tray 302 containing partially frozen vacuum sealed coconuts 208 is fully immersed in cooling bath mixture in temperature range −72 degree Celsius to −65 degree Celsius for 40-50 minutes depending on the batch size of coconuts. The cooling bath mixture is alcohol-based, and contains at least one of dry ice and liquid nitrogen, such as, but not limited to, mixtures of 99.9% ethanol and dry ice, or mixtures of methanol and liquid nitrogen.

The completely frozen coconut shells 216 are stored in frozen storage 218 at −18 degree Celsius. Alternatively, it could be stored at −25 degree Celsius, −6 degree Celsius, or at any temperature at or below 0 degree Celsius.

Figure 2B:
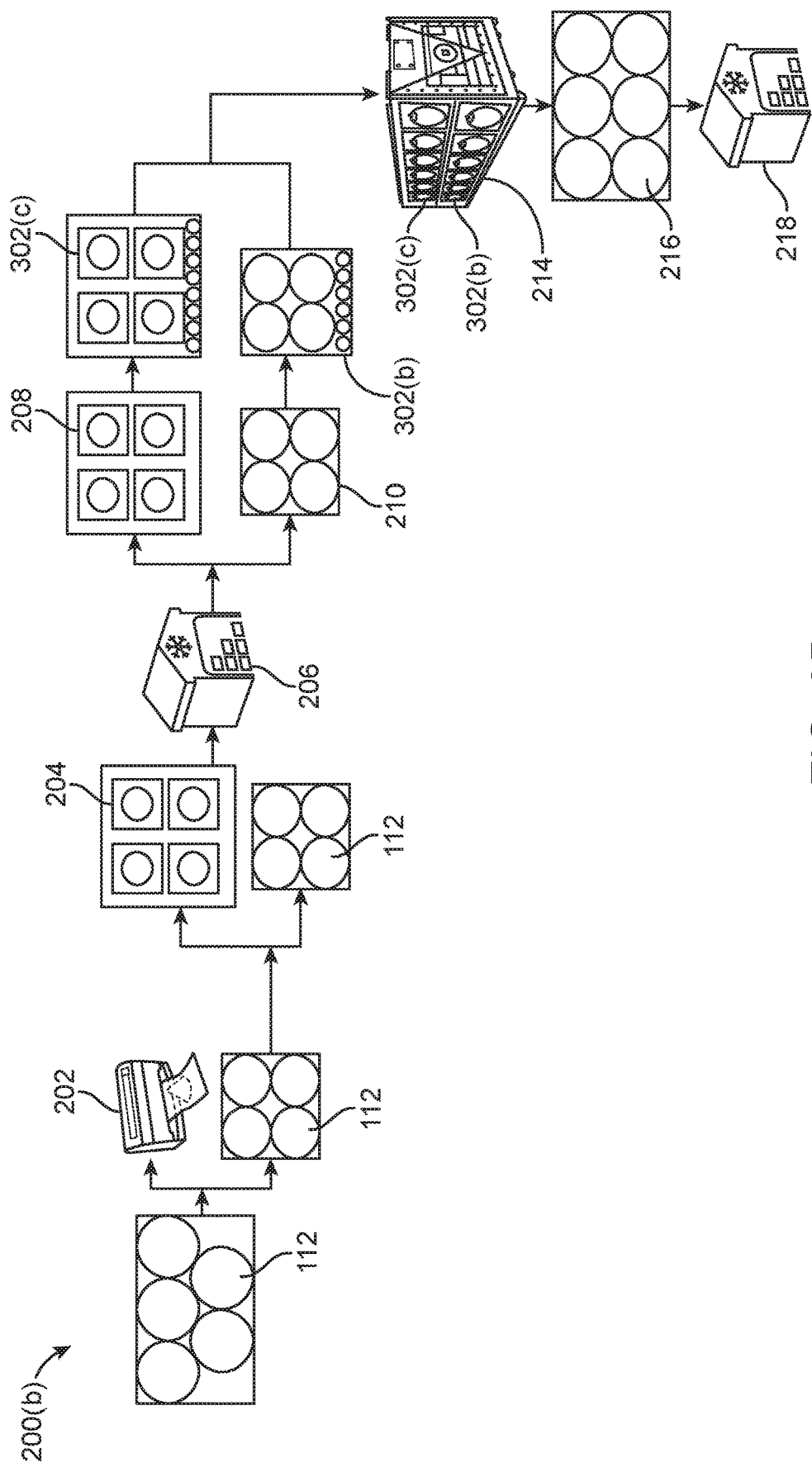
FIG. 2B illustrates a schematic representation of system for preparing frozen coconuts from dried dehusked coconuts optionally sealed in vacuum seal bags in slow freezing unit, according to an embodiment of the present invention.
Figure 6A:
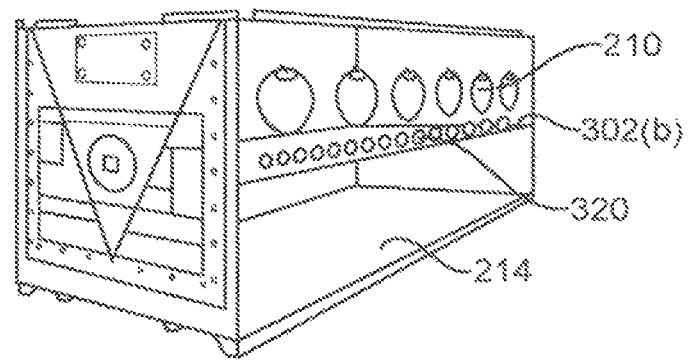
FIG. 6A illustrates a schematic representation of a slow freezing unit which is a standard freezer comprising coconut holding tray containing partially frozen coconuts without any packaging for completely freezing the partially frozen coconut shell without any packaging, according to an embodiment of the present invention.
Figure 6B:
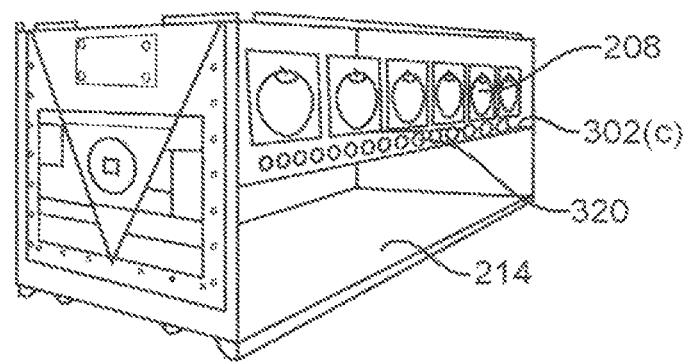
FIG. 6B illustrates a schematic representation of a slow freezing unit which is a standard freezer comprising coconut holding tray containing partially frozen vacuum sealed coconuts for completely freezing the partially frozen vacuum sealed coconuts, according to an embodiment of the present invention.

FIG. 2B illustrates a schematic representation of system for preparing frozen coconuts from dried dehusked coconuts optionally sealed in vacuum seal bags in slow freezing unit, according to an embodiment of the present invention;

In this system, the dried dehusked coconuts 112 are either vacuum sealed using vacuum sealing machine to form vacuum sealed coconuts 204 or used as dried dehusked coconuts without any packaging 112 for partially freezing the content and reducing the inner pressure of the dried dehusked coconuts 112. The vacuum sealed coconuts 204 and the completely dried dehusked coconuts 112 are moved to a chilling unit such as a chilling room 206 for forming partially frozen vacuum sealed coconuts 208 and partially frozen coconuts without any packaging 210 respectively. Referring to FIGS. 3B and 3C, the partially frozen coconuts without any packaging 210 and the partially frozen vacuum sealed coconuts 208 are arranged in a porous coconut holding tray 302 (b), 302 (c) respectively. The coconut holding tray 302 (b), 302 (c) are placed in slow freezing unit. The slow freezing unit 214, referring to FIGS. 6A and 6B, is a standard freezer having −25 degree Celsius temperature. The coconut are kept for at least 24 hours depending on the batch size of coconut shells. This freezing unit 214 is used for freezing both partially frozen vacuum sealed coconuts 208 and partially frozen coconuts without any packaging 210.

FIG. 3A illustrates a schematic representation of a coconut holding tray capable to hold partially frozen vacuum sealed or unpackaged coconuts to be completely frozen; according to an embodiment of the present invention;

A coconut holding tray 302 (a) comprising a top cover 304, a base 306, a plurality of side casings 314, 316, at least one partitioned compartment 308, 310, 312 comprising individual container basket 318 for holding one partially frozen vacuum sealed coconut shell bag 208. Each compartment 308, 310, 312 comprise at least one round shaped opening. The individual container basket 318 comprises partially frozen vacuum sealed coconut shell bag 208 (or an unpackaged coconut not shown in the figure). After loading the coconut holding tray 302 (a) with the partially frozen vacuum sealed coconut 208, the top cover 304 is closed. In this situation the at least one partially frozen vacuum sealed coconut 208 is accessible only through the at least one round shaped opening which is located on the top cover 304 of the coconut holding tray 302 (a) which allows free liquid flow across the compartments but prevents partially frozen vacuum sealed coconuts 208 to touch other each other to prevent them from sticking together or from potential cracking of the vacuum bags sealing the vacuum sealed coconuts.

FIGS. 3B and 3C illustrate a schematic representation of a coconut holding tray 302 capable of holding partially frozen vacuum sealed coconuts 208 or partially frozen coconut shell without any packaging 210 for producing completely frozen coconut shell 216, according to an embodiment of the present invention.

A coconut holding tray 302 (b), 302 (c) comprising porous air holes 320, peripheral side-walls 322, and space 324 for holding coconut shell. The porous air holes 320 in the coconut holding tray allows good air flow inside freezing unit.

FIGS. 4 and 5 illustrates a schematic representation of top and side view of shock freezing unit comprising insulated tub for holding coconut holding tray and cooling bath mixture for completely freezing the partially frozen vacuum sealed coconuts and producing frozen coconuts.

The shock freezing unit 212 (as shown in FIG. 2A) comprises an insulated tub 402 for holding coconut holding tray 302 and cooling bath mixture 404 for completely freezing the partially frozen vacuum sealed coconuts 208.

FIGS. 6A and 6B illustrates a schematic representation of a slow freezing unit 214 comprising coconut holding tray containing partially frozen coconuts and standard freezer for freezing the partially frozen vacuum sealed coconuts 208 or partially frozen unpackaged coconut 210 and producing frozen coconuts respectively The slow freezing unit 214 is a standard freezer having −25 degree Celsius temperature for completely freezing the partially frozen coconut shell bag. This freezing unit 214 is used for freezing both partially frozen vacuum sealed coconut shell bag 208 and partially frozen coconut shell without any packaging 210.

Figure 7:
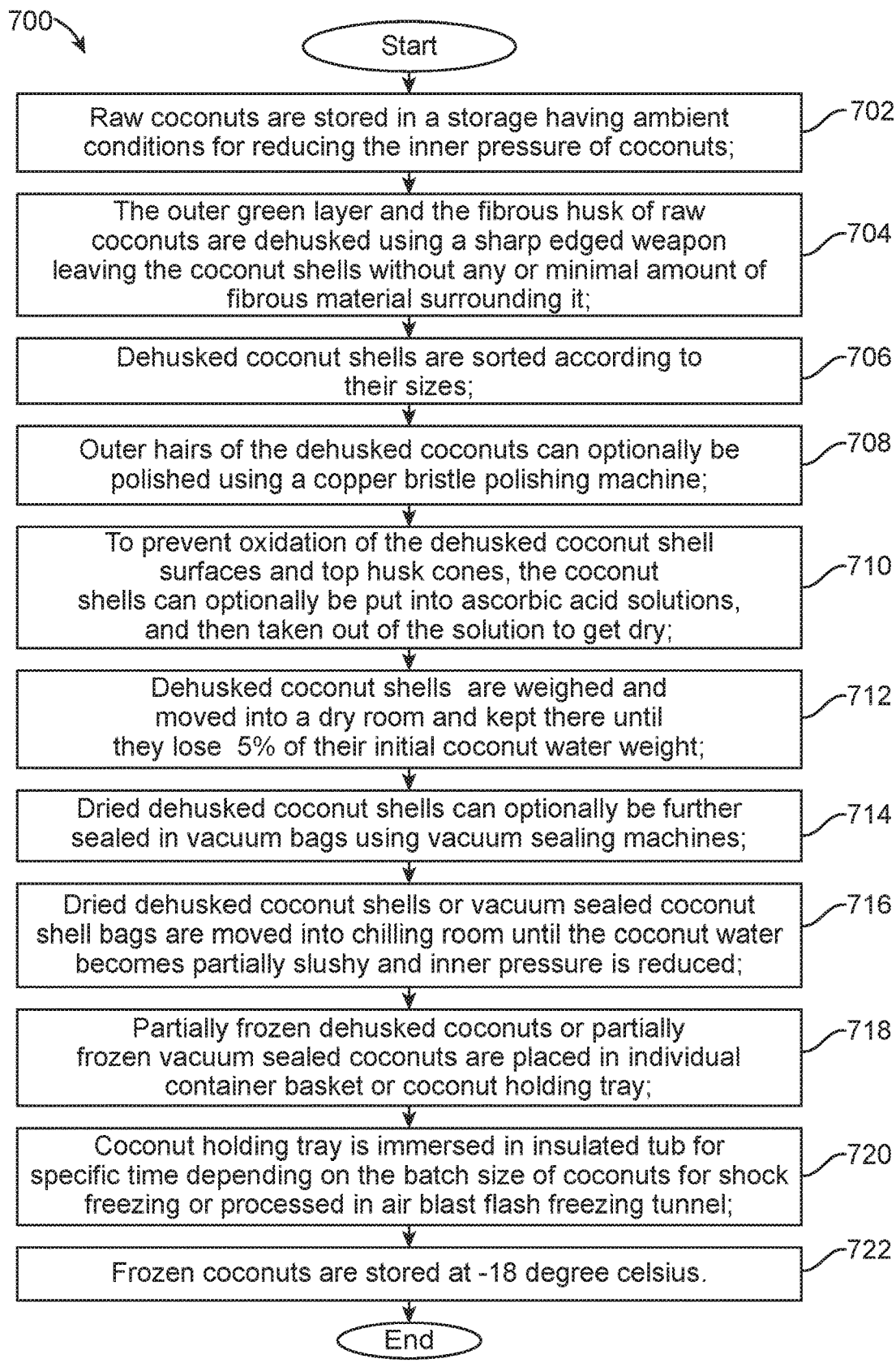
FIG. 7 depicts an exemplary flowchart illustrating a method of preparing frozen coconuts using shock freezing unit, according to an embodiment of the present invention.

FIG. 7 illustrates an exemplary flowchart 700 illustrating a method of preparing the frozen coconuts using shock freezing unit, according to an embodiment of the present invention;

Initially at step 702, the raw coconuts after having been harvested preferably in the afternoon and after 25 days so that they have preferably two layers of coconut meat, and after inspection, are stored for at least two days in a storage room having ambient temperature and away from direct sunlight for reducing the inner pressure of raw coconuts;

At step 704, the outer green layer and the fibrous husk of raw coconuts are dehusked leaving the coconut shells without any or minimal amount of fibrous material surrounding the coconut shells;

At step 706, the dehusked coconut shells are sorted according to their sizes, weight and thickness;

At step 708, the outer hairs of the dehusked coconut shells are optionally polished using a polishing machine such as copper bristle polishing machine;

At step 710, to prevent oxidation and contamination by mold or fungus of the dehusked and polished coconut shells surfaces and top husk cones, the coconut shells are optionally put into one or several organic or non-organic solutions such as an ascorbic acid solution, and then taken out of the solution to get dry;

At step 712, the dehusked (and optionally polished) coconut shells are weighed and moved into a dry room having humidity less than 40% and temperature more than 25 degree Celsius and kept there until the coconuts lose more than 5% of their initial weight prior to drying;

At step 714, the dried dehusked coconut shells can be optionally sealed in vacuum bags using vacuum sealing machine;

At step 716, the either vacuum sealed coconuts or unpackaged coconuts are moved into a cold storage unit such as a chilling room having −5 degree Celsius temperature for at least 2-3 days until the coconut water in the coconut shell becomes partially slushy and with a core temperature of −0.1 degree Celsius to −3 degree Celsius and inner pressure inside the partially frozen coconut has decreased;

At step 718, the partially frozen vacuum sealed or unpackaged coconuts are placed in individual container basket of coconut holding tray;

At step 720, the coconut holding tray containing partially frozen vacuum sealed or unpackaged coconuts proceeds to a shock freezing unit. The coconut holding tray can for example be immersed in insulated tub filled with cooling bath mixture for 40-50 minutes at −72 degree to −65 degree Celsius depending on the batch size of coconut shells or be processed through an air blast flash freezing tunnel; and At step 722, after the shock freezing unit, the frozen coconuts are brought to frozen storage and stored at −18 degree Celsius. Alternatively, they could be stored at −25 degree Celsius, −6 degree Celsius, or at any temperature at or below 0 degree Celsius.

Figure 8:
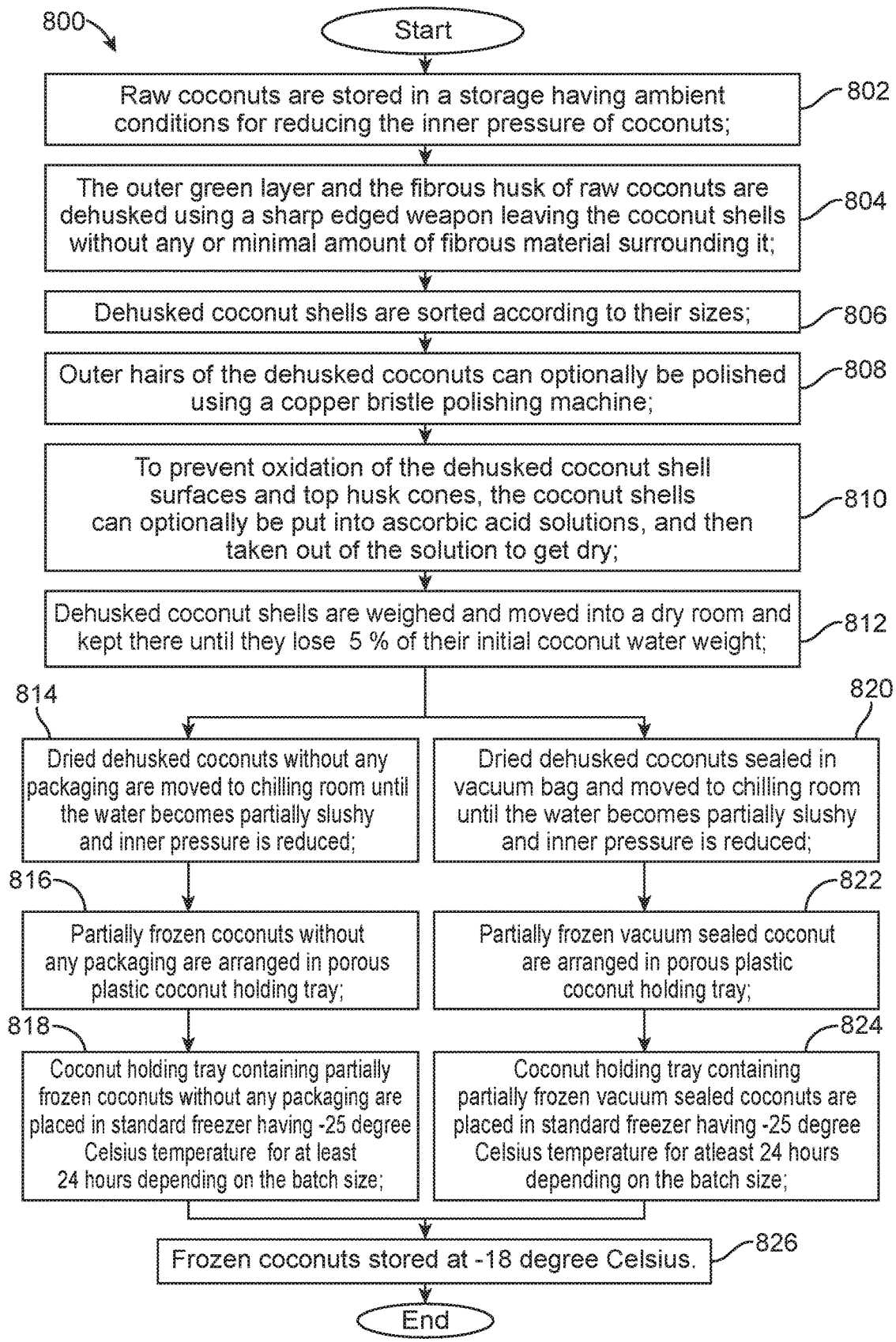
FIG. 8 depicts an exemplary flowchart illustrating a method of preparing frozen coconuts using slow freezing unit, according to an embodiment of the present invention.

FIG. 8 depicts an exemplary flowchart 800 illustrating a method of preparing frozen coconuts using slow freezing unit, according to an embodiment of the present invention;

Initially at step 802, the raw coconuts after having been harvested preferably in the afternoon and after 25 days so that they have preferably two layers of coconut meat, and after inspection, are stored for at least two days in a storage room having ambient temperature and away from direct sunlight for reducing the inner pressure of raw coconuts;

At step 804, the outer green layer and the fibrous husk of raw coconuts are dehusked using a sharp edged weapon leaving the coconut shells without any fibrous material surrounding it;

At step 806, the dehusked coconut shells are sorted according to their sizes, weight and thickness;

At step 808, the outer hairs of the dehusked coconut shells are optionally polished using a polishing machine such as copper bristle polishing machine;

At step 810, to prevent oxidation and contamination by mold or fungus of the dehusked (and optionally polished) coconut shells surfaces and top husk cones, the coconut shells are optionally put into one or several organic or non-organic solutions such as an ascorbic acid solution, and then taken out of the solution to get dry;

At step 812, the dehusked (and optionally polished) coconut shells are weighed and moved into a dry room having humidity less than 40% and temperature more than 25 degree Celsius and kept there until the coconuts lose more than 5% of their initial weight prior to drying;

At step 814, the dried dehusked coconuts without any packaging are moved into a cold storage having −5 degree Celsius temperature for at least 2-3 days until the coconut water in the coconut becomes partially slushy forming partially frozen coconut and with a core temperature of −0.1 degree Celsius to −3 degree Celsius and inner pressure inside the partially frozen coconut has decreased;

At step 816, the partially frozen coconut without any packaging are arranged in porous plastic coconut holding tray;

At step 818, the coconut holding tray containing partially frozen coconut without any packaging is kept in a freezer having −25 degree Celsius temperature for at least 24 hours depending on the batch size of coconuts;

At step 820, the dried dehusked coconut is sealed in vacuum bag using vacuum sealing machine. In this step, the vacuum sealed coconuts are moved to into a cold storage having −5 degree Celsius temperature for at least 2-3 days until the coconut water in the coconut shell becomes partially slushy forming partially frozen vacuum sealed coconuts with a core temperature of −0.1 degree Celsius to −3 degree Celsius and inner pressure inside the partially frozen coconut has decreased;

At step 822, the partially frozen vacuum sealed coconuts are arranged in porous plastic coconut holding tray;

At step 824, the coconut holding tray containing partially frozen vacuum sealed coconuts is kept in a freezer having −25 degree Celsius temperature for at least 24 hours depending on the batch size of coconuts;

At step 826, the frozen coconuts are brought to frozen storage and stored at −18 degree Celsius. Alternatively, they could be stored at −25 degree Celsius, −6 degree Celsius, or at any temperature at or below 0 degree Celsius.

EXAMPLES

The following example is illustrative of the present invention, however, it will be understood that the invention is not limited to the specific details set forth in the example:

Example 1 Frozen Coconut Shell Obtained by Using Shock Freezing Unit

One hundred forty four raw coconuts were harvested; quality-checked and was stored in a store room having ambient temperature and away from direct sunlight to reduce the inner pressure of the raw coconuts for 2 days. The raw coconuts were dehusked, sorted, polished to get dehusked and polished coconut shells. The dehusked and polished coconuts were weighed and stored in a dry room having humidity less than 40 percent and temperature above 25 degree Celsius until they lost more than 5% of their initial weight before drying. The dried dehusked and polished coconuts were sealed in 100 micron thick K Nylon vacuum bags using vacuum sealing machine to apply 360 pressure on the outer coconut shell. The vacuum sealed coconuts were moved to a chilling room having −5 degree Celsius temperature for 2-3 days until the core temperature of coconuts reaches in range −0.1 degree Celsius to −3 degree Celsius temperature. Now, a partially frozen vacuum sealed coconut was placed in an individual container basket of coconut holding tray and 36 such partially frozen vacuum sealed coconut shell bags were arranged in single coconut holding tray. Four such coconut holding trays were fully immersed at the same time in shock freezing unit comprising insulated tub filled with mixture of 99.9% pure ethanol and dry ice at the same time. The temperature of cooling bath was −72 degree Celsius to −65 degree Celsius. More dry ice was added to maintain temperature of the cooling bath. The coconut holding trays were left in insulated tub containing mixture of 99.9% pure ethanol and dry ice for 40-50 minutes and taken out at the same time. Frozen coconuts were further stored in the frozen storage and can be used for more than a year.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. For example, many of the process steps disclosed herein are optional steps that may or may not improve the process or which may only be used in certain situations. By way of non-limiting example, the steps of sorting coconuts, storing coconuts in ambient conditions for some time period, preventing oxidation of the coconuts, vacuum sealing the coconuts in bags, polishing the coconuts, and partially freezing the coconuts prior to freezing are optional and may not be necessary. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for preparing a frozen coconut containing frozen coconut meat and frozen coconut water, the method comprising:
   providing a polished, dehusked and untapped coconut comprising an intact coconut shell, and that contains coconut meat and young coconut water enclosed within the coconut shell;
   wherein said polished, dehusked and untapped coconut shell comprises a young green coconut having its outer green exocarp layer and a substantial portion of its fibrous husk mesocarp middle layer removed;
   drying moisture from said polished, dehusked and untapped coconut to weigh 95% or less than its weight prior to the drying, to create a dried, polished, dehusked and untapped coconut that comprises the intact coconut shell and contains said coconut meat and further contains said young coconut water enclosed within the coconut shell;
   vacuum sealing, within a bag, said dried, polished, dehusked and untapped coconut that contains said coconut meat and said young coconut water enclosed within the coconut shell to create a vacuum sealed package;
   freezing said vacuum sealed package, in an environment at or below 0 degrees Celsius to create the frozen coconut containing the frozen coconut meat and frozen coconut water; and
   storing said frozen coconut.

2. The method of claim 1, further comprising prior to said freezing, chilling said dried, polished, dehusked and untapped coconut to partially freeze said dried, polished, dehusked and untapped coconut that contains said coconut meat and said young coconut water enclosed within the coconut shell.

3. The method of claim 1, wherein the drying takes place in an environment with humidity less than 40% and/or temperature above 25 degrees Celsius.

4. The method of claim 1, wherein the freezing of said dried, polished, dehusked and untapped coconut is done with at least one of a freezer and an air blast tunnel.

5. The method of claim 1, wherein said young green coconut contains at least one layer of said coconut meat.

6. The method of claim 1, wherein the freezing includes subjecting said dried, polished, dehusked and untapped coconut to an environment at or below minus 18 degrees Celsius.

7. The method of claim 1, further comprising prior to said drying, treating said polished, dehusked and untapped coconut containing said coconut meat and said young coconut water enclosed within the coconut shell, in a solution to prevent oxidation.

8. The method of claim 1, wherein said polished, dehusked and untapped coconut comprises all of said fibrous husk mesocarp middle layer removed.

9. The method of claim 1, wherein said young green coconut has been rested for at least two days prior to having said outer green exocarp layer removed and said substantial portion of said fibrous husk mesocarp middle layer removed.

10. The method of claim 1, wherein said freezing of said vacuum sealed package in an environment at or below 0 degrees Celsius comprises a step of providing an environment selected from air, an alcohol bath comprising at least one of dry ice and liquid nitrogen, a mixture of ethanol and dry ice, and a mixture of methanol and liquid nitrogen.

11. The method of claim 1, wherein said drying is performed for about three days.

12. The method of claim 1, further comprising, prior to said drying, immersing said polished, dehusked and untapped coconut into one of an anti-bug, an anti-mold, or an anti-fungal solution.

13. A method for preparing a frozen coconut containing frozen coconut meat and frozen coconut water, the method comprising:
providing a dehusked and untapped coconut comprising an intact coconut shell and that contains coconut meat and young coconut water enclosed within the coconut shell;
wherein said dehusked and untapped coconut comprises a young green coconut having its outer green exocarp layer removed and a substantial portion of its fibrous husk mesocarp middle layer removed and leaving a protective top husk that covers two eyes and a mouth of said dehusked and untapped coconut, and wherein said protective top husk is cone shaped;
drying moisture from said dehusked and untapped coconut to weight 95% or less than its weight prior to the drying, to create a dried, dehusked, and untapped coconut that comprises the intact coconut shell and that contains said coconut meat and further contains said young coconut water enclosed within the coconut shell;
vacuum sealing, within a bag, said dried, dehusked and untapped coconut that contains said coconut meat and said young coconut water enclosed within the coconut shell, to create a vacuum sealed package;
freezing said vacuum sealed package, in an environment at or below 0 degrees Celsius to create the frozen coconut containing the frozen coconut meat and frozen coconut water; and
storing said frozen coconut.

14. The method of claim 13, wherein said dehusked and untapped coconut comprises a polished, dehusked and untapped coconut that contains the coconut meat and the young coconut water enclosed within the coconut shell.

15. The method of claim 13, wherein said freezing of said vacuum sealed package in an environment at or below 0 degrees Celsius comprises a step of providing an environment selected from air, an alcohol bath comprising at least one of dry ice and liquid nitrogen, a mixture of ethanol and dry ice, and a mixture of methanol and liquid nitrogen.

16. The method of claim 13, wherein said drying is performed for about three days.

17. A method for preparing a frozen coconut containing frozen coconut meat and frozen coconut water, the method comprising:
providing a dehusked and untapped coconut that comprises an intact coconut shell and contains coconut meat and containing young coconut water enclosed within the coconut shell;
wherein said dehusked and untapped coconut comprises a young green coconut having its outer green exocarp layer and a substantial portion of its fibrous husk mesocarp middle layer removed;
wherein said young green coconut has been rested for at least two days prior to having said outer green exocarp layer removed and a substantial portion of said fibrous husk mesocarp middle layer removed;
drying moisture from said dehusked and untapped coconut, to weigh 95% or less than its weight prior to the drying, to create a dried, dehusked and untapped coconut that comprises the intact coconut shell and contains said coconut meat and further contains said young coconut water enclosed within the coconut shell;
vacuum sealing, within a bag, said dried, dehusked and untapped coconut that contains said coconut meat within and said young coconut water enclosed within the coconut shell, to create a vacuum sealed package;
freezing the vacuum sealed package in an environment at or below 0 degrees Celsius to create the frozen coconut containing the frozen coconut meat and frozen coconut water; and
storing said frozen coconut.

18. The method of claim 17, wherein said dehusked and untapped coconut comprises a polished, dehusked and untapped coconut that comprises the intact coconut shell and that contains said coconut meat within and said young coconut water enclosed within the coconut shell.

* * * * *